United States Patent
Sandstrom et al.

(10) Patent No.: US 7,137,423 B2
(45) Date of Patent: Nov. 21, 2006

(54) TIRE WITH COMPONENT COMPRISED OF AMINE FUNCTIONALIZED STYRENE/DIENE COPOLYMER ELASTOMER, SILANOL FUNCTIONALIZED CARBON BLACK AND COUPLING AGENT

(75) Inventors: Paul Harry Sandstrom, Cuyahoga Falls, OH (US); John Joseph Andre Verthe, Kent, OH (US); Raymond Robert DiRossi, Akron, OH (US); Bill Bud Gross, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 459 days.

(21) Appl. No.: 10/457,084

(22) Filed: Jun. 6, 2003

(65) Prior Publication Data

US 2004/0249020 A1     Dec. 9, 2004

(51) Int. Cl.
    *B60C 11/00*     (2006.01)
(52) U.S. Cl. .................. 152/209.1; 523/206; 523/209; 524/262
(58) Field of Classification Search ............. 152/209.1; 523/206, 209, 205; 524/262
    See application file for complete search history.

(56) References Cited

U.S. PATENT DOCUMENTS

| | | | |
|---|---|---|---|
| 4,603,722 A * | 8/1986 | Oshima et al. .......... | 152/209.5 |
| 4,647,625 A | 3/1987 | Aonuma et al. ............ | 528/232 |
| 5,047,483 A * | 9/1991 | Halasa et al. ................ | 525/237 |
| 5,329,005 A * | 7/1994 | Lawson et al. ............. | 540/450 |
| 5,679,728 A | 10/1997 | Kawazura et al. .......... | 523/215 |
| 5,830,930 A | 11/1998 | Mahmud et al. ............ | 523/215 |
| 5,919,841 A | 7/1999 | Mahmud et al. ............ | 523/351 |
| 5,948,835 A | 9/1999 | Mahmud et al. ............ | 523/215 |
| 6,008,272 A | 12/1999 | Mahmud et al. ............ | 523/351 |
| 6,025,450 A | 2/2000 | Lawson et al. ............. | 526/340 |
| 6,071,995 A | 6/2000 | Labauze ..................... | 524/269 |
| 6,455,624 B1 * | 9/2002 | Serre .......................... | 524/492 |

FOREIGN PATENT DOCUMENTS

| | | |
|---|---|---|
| EP | 590491 | 4/1994 |
| EP | 894825 | 2/1999 |
| EP | 905188 | 3/1999 |
| EP | 1241204 | 9/2002 |
| EP | 1273620 | 1/2003 |

OTHER PUBLICATIONS

European Search Report.

* cited by examiner

*Primary Examiner*—Peter Szekely
(74) *Attorney, Agent, or Firm*—Henry C. Young, Jr.

(57) ABSTRACT

The invention relates to a tire having at least one component (e.g. tread) of a rubber composition comprised of an amine functionalized styrene/conjugated diene copolymer elastomer (e.g. styrene/butadiene and/or styrene/isoprene/butadiene copolymer elastomer) which contains reinforcement comprised of silanol functionalized particulate carbon black having silica domains covering a fraction of the carbon black surface together with an alkoxysilane polysulfide coupling agent. The silica domains on the carbon black surface contain hydroxyl groups (e.g. silanol groups) on their surfaces which are reactive with the alkoxysilane moiety of the coupling agent. The amine functionalized styrene/butadiene elastomer is an organic solution polymerization prepared elastomer which contains pendant and/or terminal amine groups as one or more of primary amine, secondary amine, tertiary amine, and/or heterocyclic amine groups. The amine functionalized elastomer may be tin coupled.

17 Claims, No Drawings

TIRE WITH COMPONENT COMPRISED OF AMINE FUNCTIONALIZED STYRENE/DIENE COPOLYMER ELASTOMER, SILANOL FUNCTIONALIZED CARBON BLACK AND COUPLING AGENT

FIELD OF THE INVENTION

The invention relates to a tire having at least one component (e.g. tread) of a rubber composition comprised of an amine functionalized styrene/conjugated diene copolymer elastomer (e.g. styrene/butadiene and/or styrene/isoprene/butadiene copolymer elastomer) which contains reinforcement comprised of silanol functionalized particulate carbon black having silica domains covering a fraction of the carbon black surface together with an alkoxysilane polysulfide coupling agent. The silica domains on the carbon black surface contain hydroxyl groups (e.g. silanol groups) on their surfaces which are reactive with the alkoxysilane moiety of the coupling agent. The amine functionalized styrene/butadiene elastomer is an organic solution polymerization prepared elastomer which contains pendant and/or terminal amine groups as one or more of primary amine, secondary amine, tertiary amine, and/or heterocyclic amine groups. The amine functionalized elastomer may be tin coupled.

BACKGROUND OF THE INVENTION

Tires are historically prepared with treads of rubber compositions which are comprised of various diene-based elastomers which are often comprised of a combination of cis 1,4-polybutadiene with styrene/butadiene copolymer and/or styrene/isoprene/butadiene copolymer elastomers, although minor amounts of other elastomers may also be present. For some tires such as, for example, load bearing truck tires, the tread rubber may be composed of a significant amount of natural cis 1,4-polyisoprene rubber.

The rubber compositions for various tire components (e.g. tire treads) conventionally contain particulate reinforcing fillers which may be, for example, rubber reinforcing carbon black and/or aggregates of precipitated silica. Such reinforcement fillers are will known to those having skill in such art.

Each of the carbon black and silica particulate reinforcements tend to provide different aspects of physical reinforcement for the diene-based rubber composition. The silica usually requires the aid of a coupling agent to couple the silica to a diene-based elastomer for a more ideal reinforcement of the rubber composition. For example, a precipitated silica conventionally contains hydroxyl groups (e.g. silanol groups) on its surface which is reactive, for example, with an alkoxysilane moiety contained in an alkoxysilane polysulfide based coupling agent.

Sometimes, functionalized silica-treated, or silica modified, carbon blacks are used for the rubber reinforcement which are composed of carbon black which contains silica domains on its surface and where the silica domains contain hydroxyl groups (e.g. silanol groups) on their surface which are, in turn, reactive with an alkoxysilane moiety contained in an alkoxysilane polysulfide based coupling agent. For silica containing carbon blacks, see, for example, U.S. Pat. Nos. 5,679,728, 5,830,930, 5,919,841, 5,948,835 and 6,008,272.

Such carbon blacks which contain silica domains on their surface are envisioned as providing attributes of both carbon black reinforcement and silica reinforcement for diene-based elastomeric rubber compositions. The silica domains may normally be expected to, in turn, contain hydroxyl groups (e.g. silanol groups) on their surface which would be reactive with a coupling agent such as, for example, an alkoxysillane polysulfide based coupling agent. In one aspect, it might be envisioned that if only a fraction of the surface of the carbon black contains the silica domains, then only a somewhat corresponding fraction of a coupling agent (e.g. alkoxysilane polysulfide based coupling agent) need be used to aid in coupling the particulate reinforcement to a diene-based elastomer.

Various amine functionalized styrene/butadiene copolymer elastomers have been suggested for use in rubber compositions for various tire components. For example, see U.S. Pat. No. 6,025,450.

A significant aspect of this invention is the use of silanol functionalized carbon black in combination with an amine functionalized styrene/conjugated diene copolymer elastomer together with an alkoxysilane polysulfide based coupling agent.

In the description of the invention, the term "phr" relates to parts by weight of a particular ingredient per 100 parts by weight of rubber contained in a rubber composition.

The terms "rubber" and "elastomer" are used interchangeably unless otherwise indicated, and the terms "cure" and "vulcanize" may be used interchangeably unless otherwise indicated. The terms "compound" and "rubber composition" may be used interchangeably unless otherwise indicated.

SUMMARY AND PRACTICE OF THE INVENTION

In accordance with this invention, a tire is provided having at least one component of a rubber composition comprised of, based upon parts by weight per 100 parts by weight of elastomer (phr), (A) elastomers comprised of:
(1) about 30 to about 80 phr of an amine functionalized styrene/conjugated diene copolymer elastomer which contains pendant and/or terminal amine groups selected from primary amine, secondary amine, tertiary amine and heterocyclic amine groups, wherein said conjugated diene of said copolymer is selected from at least one of isoprene and butadiene, and
(2) about 20 to about 70 phr of at least one additional conjugated diene-based elastomer; and (B) about 35 to about 100, alternately about 55 to about 100, phr of particulate reinforcement comprised of
(1) about 10 to about 100, alternately about 35 to about 95, phr of silanol functionalized carbon black comprised of carbon black having domains of silica on its surface wherein said silica domains contain silanol groups on their surfaces, and
(2) from zero to about 90, alternately about 5 to about 65, phr of at least one of synthetic amorphous silica (preferably precipitated silica) and carbon black without domains of silica on its surface, and mixtures thereof, wherein said synthetic amorphous silica contains hydroxyl groups (e.g. silanol groups) on its surface, and (C) an alkoxysilane polysulfide based coupling agent having:
(1) an alkoxysilane moiety reactive with
(a) said silanol groups contained on the surface of said silica domains on the surface of said functionalized carbon black and said silanol groups on the surface of said synthetic amorphous silica; and (b) said amine groups of said amine functionalized styrene/conjugated diene copolymer elastomer, and;

(2) a polysulfide moiety interactive with polybutadiene portion of said amine functionalized styrene/conjugated diene copolymer elastomer and with said additional conjugated diene-based elastomer.

In practice, said amine functionalized styrene/conjugated diene copolymer elastomers are preferably selected from amine functionalized styrene/butadiene copolymer and styrene/isoprene/butadiene terpolymer elastomers.

In practice, said amine functionalized styrene/conjugated diene copolymer may be an amine functionalized styrene/butadiene copolymer which contains from about 5 to about 40 weight percent bound styrene based upon the styrene/butadiene copolymer.

In practice, said amine functionalized styrene/conjugated diene copolymer may be an amine functionalized styrene/isoprene/butadiene terpolymer which contains from about 10 to about 30 weight percent (units derived from) styrene, about 10 to about 70 weight percent (units derived from) isoprene and about 10 to about 70 weight percent (units derived from) butadiene based upon the styrene/isoprene/butadiene terpolymer.

In one aspect, for said silanol functionalized carbon black, said silica domains desirably cover from about 10 to about 70, alternately from about 45 to about 65, percent of the surface of the carbon black. It is believed to be difficult to determine precisely the percentage of the carbon black surface actually covered by the plurality of silica domains so that the coverage of the carbon black surface is expressed in terms of "about" which is intended to mean "approximate" values and is intended to provide a carbon black having a significant average fraction of its surface covered by the silica domains and to exclude a carbon black which has its surface completely covered by silica and exclude a carbon black which may contain silica dispersed within the carbon black itself but little or no silica domains on its surface. Therefore, it is intended that the silanol functionalized carbon black presents a surface to the elastomer(s) which is composed of both carbon black as well as silica which contains silanol groups and thereby presents a combination of carbon black and silica reinforcement moieties to the elastomer(s).

In one aspect of the invention, the silanol functionalized carbon black is pre-reacted with an alkoxysilane polysulfide based coupling agent, for example a bis(3-triethoxysilylpropyl) polysulfide having an average of from 2 to 4 connecting sulfur atoms in its polysulfidic bridge, to form a composite thereof prior to addition to the rubber composition. In such manner, then, an alcohol byproduct (e.g. ethanol) is formed (by reaction of the silanol groups on the silica treated carbon black and the alkoxy group moiety of the coupling agent) during the formation of the composite before introducing the ingredients into the rubber composition instead of in situ within the rubber composition itself which may be beneficial where alcohol emission within the rubber manufacturing plant or in the resulting tire itself might be of a concern.

In one aspect, said alkoxysilane polyusulfide based coupling agent may be a bis-(3-triethoxysilylpropyl) polysulfide having an average of from about 2 to about 4, and particularly an average of from about 2 to about 2.5, or an average of from about 3 to about 4, connecting sulfur atoms in its polysulfidic bridge.

In one aspect, a combination of a first bis-(3-triethoxysilylpropyl) polysulfide having an average of from 2 to about 2.5 connecting sulfur atoms in its polysulfidic bridge and a second bis-(3-triethoxysilylpropyl) polysulfide having an average of from 3 to 4 connecting sulfur atoms in its polysulfidic bridge, wherein said first polysulfide is blended with said rubber composition in the absence of sulfur and sulfur vulcanization accelerator and wherein said second is thereafter blended with said rubber composition in the presence of sulfur and at least one sulfur vulcanization accelerator.

In practice, said amine functionalized styrene/conjugated diene copolymer elastomer and/or said additional conjugated diene-based elastomer may be tin coupled to provide an elastomer of significantly increased molecular weight and correspondingly increased Mooney (ML 1+4) viscosity.

The amine functionalized styrene/conjugated diene copolymer elastomer may be provided as having at least one terminal amine group and/or as having pendant amine groups which are distributed along the copolymer itself.

For example, the amine groups might be introduced (positioned) along the copolymer chain by first introducing an amine group onto a monomer used in the formation of the copolymer. For example, the styrene monomer might be modified with an amine group. For example, divinylbenzene might be modified with an amine group and a very small amount of the modified divinylbenzene introduced into the copolymerization reaction.

For example, the amine groups might be introduced (positioned) as one or more terminal amine groups at an end of the copolymer chain by using an amine-modified polymerization initiator for the styrene/conjugated diene copolymerization reaction or by adding a chain terminating agent to the copolymerization reaction after a suitable copolymer has been formed. A chain terminating agent may be, for example, a pyrrolidine based material.

The said amine groups on the copolymer are considered herein as being amine groups that may usually be considered as being interactive with a bis-(3-triethoxysilylpropyl) polysulfide having an average of from 2 to 4 connecting sulfur atoms in its polysulfidic bridge.

The following exemplary general formulas are provided as examples of various amine group substituents on the copolymer and are not intended to be limiting for this invention. In general, it is envisioned that the copolymer (e.g. a butadiene moiety of the copolymer) is attached to the amine group by one of the carbon atoms (a carbon atom included in an "R" group of the amine group) unless the amine group does not have an "R" group in which case it is envisioned that the copolymer (e.g. a butadiene moiety of the copolymer) is attached directly to the nitrogen of the amine group.

For example, such amine groups may be of the general formula (I) for primary, secondary and tertiary amine groups, although such general formula is not intended to be limiting:

(I)

wherein x is a value of from 1 or 3, alternately, and usually preferably, from 2 through 3; and R is selected from saturated straight chain alkyl radicals and saturated branched alkyl radicals which contain from 1 through 18 carbon atoms, alternately from 1 through 12 carbon atoms, provided that at least one saturated alkyl radical contains from 1 through 6 carbon atoms.

Such amine groups may be, for example, aryl, alkaryl and aralkyl amine groups, and may be of the general formula (II), although such general formula is not intended to be limiting:

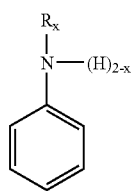

(II)

wherein x is a value of from 1 or 2, R is selected from said saturated straight chain and said saturated branched alkyl radicals having from 1 through 20 carbon atoms, alternately from 1 through 6 carbon atoms, provided however that at least one R contains from 1 through 6 carbon atoms.

For the above general formulas (I) and (II), representative of said saturated straight chain alkyl radicals are, for example, methyl, ethyl, n-propyl, n-butyl, n-pentyl and n-hexyl radicals. Representative of said saturated branched alkyl radicals are, for example isobutyl, isopropyl, isopentyl and isohexyl radicals.

Such amine groups may also be heterocyclic amine groups, for example, selected from pyidine, pyrrolidene and indole based groups. Such heterocyclic amine groups may be, for example, of the general formulas III-A (pyridines), III-B (pyrrolidenes), and III-C (indoles) although such general formulas are not intended to be limiting:

(III-A)

(III-B)

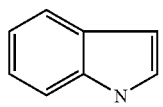

(III-C)

wherein, for said general formulas (III-A), (III-B) and (III-C), x is a value of from zero through 2, alternately and preferably 1, and wherein $R^2$ is a saturated alkyl radical containing from 1 through 6, alternately and usually preferably from 1 through 3, carbon atoms. The $R^2$ radicals are appropriately positioned on the associated ring. For example, for formula III-A, a single $R^2$ radical may be positioned in an ortho position to the nitrogen atom. For example, for formula III-B, a single $R^2$ radical may be positioned in a meta position to the nitrogen atom. For example, for formula III-C, a single $R^2$ radical may be positioned on the six member ring two carbon atoms away from the five member ring.

Representative of said saturated alkyl radicals for $R^2$ are, for example, methyl, ethyl and n-propyl radicals.

For example, an amine functionalized styrene/conjugated diene copolymer elastomer having at least one terminal amine group may be provided by copolymerizing styrene and at least one of 1,3-butadiene and isoprene monomers in an organic solvent solution with a non-cyclic amine initiator such as 3-(N,N-dimethylamine)-1-propyl lithium as Al-200™ from the FMC company. It is contemplated that such initiator may be represented by the general formula (IV) to impart at least one terminal tertiary amine group, as a tertiary amine group of the aforesaid general formula (I) in that two of the R substituents are methyl groups and one of the R substituents is an n-propyl group with the copolymer being attached to the carbon atom of the n-propyl group occupied by the lithium of the initiator, namely

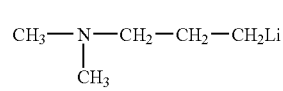

(IV)

In one aspect, the above amine based initiator may also be provided as being "chain extended" by containing a minor amount of an isoprene moiety in its chain which apparently may provide the resultant terminal amine functionalized styrene/conjugated diene copolymer elastomer of improved processability by exhibiting a reduced Mooney viscosity of the unvulcanized elastomer. Exemplary of such initiator is understood to be Al-200 CE™ from the FMC Company.

Alternately, an amine functionalized styrene/conjugated diene copolymer elastomer having at least one terminal amine group may be provided by copolymerizing styrene with 1,3-butadiene and/or isoprene monomers in an organic solvent solution with a pyrrolidine (cyclic amine) based initiator such as 3-pyrrolidino-1-propyl lithium from the FMC Company.

In a further aspect, the amine groups may be formed as pendent and/or terminal groups along the elastomer chain by, for example, pre-reacting divinyl benzene with a suitable amine to form a modified divinyl benzene which contains the amine substituent. A small amount (e.g. one to two percent of the total styrene and 1,3-butadiene monomers) of the modified divinyl benzene is introduced into the polymerization of the monomers (e.g. styrene with at least one of 1,3-butadiene and isoprene monomers) at a desirable stage of the copolymerization process in an organic solvent solution.

Alternatively, for preparation of an amine functionalized styrene/butadiene elastomer, the styrene monomer itself may be modified with, for example, a pyrrolidone and the modified styrene is copolymerized with at least one of 1,3-butadiene and isoprene monomer(s) in an organic solvent solution. It is envisioned that pendant amine groups are thereby provided on the resulting styrene/conjugated diene copolymer elastomer.

Alternatively, a vinyl pyrrolidone may be introduced during the copolymerization of the styrene with at least one of 1,3-butadiene and isoprene monomers to effect pendant amine groups from the resultant styrene/butadiene copolymer elastomer.

A significant aspect of this invention is, for a component of a tire (e.g. a rubber tire tread) use of a rubber composition comprised of the combination of both an amine functionalized styrene/conjugated diene copolymer elastomer and a silanol functionalized carbon black as a silica treated carbon black wherein the carbon black has silica domains over a fraction of the surface of the carbon black and where the silica domains contain hydroxyl groups (silanol groups) on their surfaces, together with an alkoxysilane polysulide based coupling agent having an alkoxysilane moiety which may be interactive with one or more of said amine(s) of said amine functionalized styrene/conjugated diene copolymer elastomer and reactive with said silanol groups of said functionalized carbon black.

This is considered herein to be significant because the amine functional elastomer can be selectively reacted with the silanol functionalized carbon black when contained in blends with other diene-based elastomers which have no amine functionality.

An additional significant aspect of the invention is the optional process limitation which requires the sequential use of said first and second polysulfide coupling agents.

This is considered herein to be significant because the sequential coupling agent combination can provide improved coupling of the elastomer, namely the amine functionalized styrene/conjugated diene copolymer butadiene elastomer, to reinforcing filler, namely the silanol functionalized carbon black, with reduced negative effect, such as for example, a reduction in the inherently increased Mooney viscosity caused by chemical reaction of the coupling agent, on processing of the unvulcanized rubber composition.

In practice of the invention, of said additional conjugated diene-based elastomers (other than and in addition to said amine functionalized styrene/butadiene rubber) may be used in the rubber composition for the tire component.

Such diene based elastomers may be, for example, homopolymers and copolymers of conjugated dienes such as for example isoprene and 1,3-butadiene and copolymers of such dienes with a vinyl aromatic compound such as styrene or alphamethyl styrene, preferably styrene.

Representative of such additional elastomers are, for example, cis 1,4-polyisoprene rubber (natural and synthetic), cis 1,4-polybutadiene rubber, styrene/butadiene copolymer rubber (prepared by aqueous emulsion or organic solvent polymerization and other than said functionalized SBR), styrene/isoprene/butadiene terpolymer rubber, butadiene/acrylonitrile rubber, 3,4-polyisoprene rubber and isoprene/butadiene copolymer rubber.

Preparation of tin coupled styrene/conjugated diene copolymer elastomers (e.g. styrene/butadiene elastomers), in general, via organic solvent polymerization is well known to those having skill in such art.

Tin coupled copolymers of styrene/butadiene and of styrene/isoprene/butadiene may be prepared, for example, by introducing a tin coupling agent during the copolymerization reaction in an organic solvent solution, usually at or near the end of the polymerization reaction. Such coupling of copolymers is well known to those having skill in such art.

In practice, it is usually preferred that at least 50 percent and more generally in a range of about 60 to about 85 percent of the Sn (tin) bonds in the tin coupled elastomers are bonded to butadiene units of the styrene/conjugated diene copolymer to create Sn-dienyl bonds such as butadienyl bonds.

Creation of tin-dienyl bonds can be accomplished in a number of ways such as, for example, sequential addition of butadiene to the copolymerization system or use of modifiers to alter the styrene and/or butadiene and/or isoprene reactivity ratios for the copolymerization. It is believed that such techniques, whether used with a batch or a continuous copolymerization system, is well know to those having skill in such art.

Various tin compounds, particularly organo tin compounds, may be used for the coupling of the elastomer. Representative of such compounds are, for example, alkyl tin trichloride, dialkyl tin dichloride, yielding variants of a tin coupled styrene/butadiene copolymer or styrene/isoprene/butadiene elastomer, although a trialkyl tin monochloride might be used which would yield simply a tin-terminated copolymer. Examples of tin-modified, or coupled, styrene/butadiene copolymer elastomers might be found, for example, in U.S. Pat. No. 5,064,901.

It is readily understood by those having skill in the art that the rubber composition of the tire component for this invention would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

The presence and relative amounts of the above additives are not considered to be an aspect of the present invention which is more primarily directed to the utilization of the aforesaid functionalized SBR and carbon black which contains hydroxyl functionalized silica domains on its surface for a tire tread rubber composition.

The tires can be built, shaped, molded and cured by various methods which will be readily apparent to those having skill in such art.

The invention may be better understood by reference to the following examples in which the parts and percentages are by weight unless otherwise indicated.

For the examples, various organic solvent solution polymerization prepared styrene/butadiene elastomers (S-SBR) and organic solvent solution prepared amine functionalized styrene/butadiene elastomers (A-SBR) were evaluated as illustrated in the following Table A.

TABLE A

Solution SBR's (S-SBR's) and Amine Functionalized S-SBR's (A-SBR'S)

| Polymer | Functionalized | Tg(° C.) | Mooney | % Styrene | % Vinyl |
|---|---|---|---|---|---|
| S-SBR No.1[1] | No | −72 | 70 | 18 | 10 |
| A-SBR No.1[2] | Yes | −72 | 53 | 18 | 10 |
| S-SBR No.2[3] | No | −31 | 54 | 25 | 35 |
| A-SBR No.2[4] | Yes | −30 | 54 | 25 | 35 |

TABLE A-continued

Solution SBR's (S-SBR's) and Amine Functionalized S-SBR's (A-SBR'S)

| Polymer | Functionalized | Tg(° C.) | Mooney | % Styrene | Vinyl % |
|---|---|---|---|---|---|
| S-SBR No.3[5] | No | −50 | 53 | 33 | 10 |
| A-SBR No.3[6] | Yes | −52 | 54 | 33 | 10 |

[1]S-SBR No.1 was obtained as Solflex 1810 ™ from the Goodyear Tire & Rubber Company which had about an 18 weight percent bound styrene content and where the polybutadiene portion had about a 10 percent vinyl content
[2]A-SBR No.1 was a styrene/butadiene copolymer elastomer similar to the S-SBR No.1 except that it had been amine functionalized with at least one terminal amine group by utilization of an isoprene chain extended 3-(N-N-dimethylamino)-1-propyl lithium based initiator for the copolymerization of the styrene and 1,3-butadiene monomers as Al-200 CE2 from the FMC Company in an organic solvent solution
[3]S-SBR No.2 was obtained as Solflex 2535 ™ from The Goodyear Tire & Rubber Company which had about a 25 weight percent bound styrene content and where the polybutadiene portion had about a 35 percent vinyl content
[4]A-SBR No.2 was a styrene/butadiene copolymer elastomer similar to the S-SBR No. 2 except that it had been amine functionalized with terminal amine groups by utilization of an isoprene chain extended 3-(N,N-dimethylamino)-1-propyl lithium based initiator for the copolymerization of the styrene and 1,3-butadiene monomers as Al-200 CE2 from the FMC Company in an organic solvent solution
[5]S-SBR No.3 was obtained as Solflex 3310 ™ from The Goodyear Tire & Rubber Company which had about a 33 weight percent bound styrene content and where the polybutadiene portion had about a 10 percent vinyl content
[6]A-SBR No.3 was a styrene/butadiene copolymer elastomer similar to the S-SBR No.3 except that it had been amine functionalized with terminal amine groups by utilization of a 3-(N,N-dimethylamino)-1-propyl lithium, which was not isoprene chain extended, as Al-200 from the FMC Company in an organic solvent solution

EXAMPLE I

For this Example, rubber compositions as mixtures of functionalized carbon black (carbon black having silica domains on its surface which in turn is understood to contain hydroxyl groups on their surface) and S-SBR No. 1, or A-SBR No. 1, together with an alkoxysilane polysulfide coupling agent, were prepared as identified herein Control Sample A and Sample B, respectively.

Both Samples contained the coupling agent and additionally contained antidegradant(s) (para-phenylene diamine type), tackifying resin, fatty acid, zinc oxide, rubber processing (aromatic) oil, and peptizer as well as sulfur and vulcanization accelerators.

The ingredients were mixed in one non-productive mixing state in an internal rubber mixer for about three minutes to a temperature of about 160° C., the resulting batch of rubber composition dumped from the mixer and cooled to below 40° C., followed by mixing the batch in a productive mixing stage in an internal rubber mixer for about two minutes to a temperature of about 110° C.

The rubber blends are exemplified in the following Table 1.

TABLE 1

| Material | Control Sample A | Sample B |
|---|---|---|
| Non-Productive Mix Stage (to about 160° C.) | | |
| Cis 1,4-polyisoprene rubber[1] | 25 | 25 |
| S-SBR No.1 rubber[2] | 75 | 0 |
| Functionalized carbon black[3] | 75 | 75 |

TABLE 1-continued

| Material | Control Sample A | Sample B |
|---|---|---|
| Fatty acid[4] | 3 | 3 |
| Aromatic oil | 20 | 20 |
| Antidegradant | 2.25 | 2.25 |
| Coupling agent[5] | 8 | 8 |
| A-SBR No.1 rubber | 0 | 75 |
| Productive Mix Stage (to about 110° C.) | | |
| Accelerator(s)[6] | 2.4 | 2.4 |
| Zinc oxide | 2.5 | 2.5 |
| Sulfur | 1.4 | 1.4 |

[1]Synthetic cis 1,4-polyisoprene elastomer obtained as NAT2200 ™ from The Goodyear Tire & Rubber Company
[2]Organic solvent solution prepared styrene/butadiene rubber containing about 18 percent bound styrene obtained as Solflex ® 1810 from The Goodyear Tire & Rubber Company
[3]Carbon black having silica domains on its surface as CRX4210 ™, (understood to be commercially available ECO ™ black 4210), from the Cabot Corporation. According to a presentation by M. Wang, et al (representing Cabot Corporation) entitled "Effect of Functionalization of Carbon Black on Rubber Properties" presented at "Functional Tire Fillers 2001" meeting at Fort Lauderdale, Florida, U.S.A. on Jan. 29 and 30, 2002, the silica coverage of the CRX 4210 carbon black was about 55 percent of its surface as determined from its iodine number and surface area which was the averaged value of its BET-SA and STSA as depicted in Table 1 "Analytical properties of the fillers", on Page 5 of the presentation.
[4]Primarily stearic acid
[5]Coupling agent as X266S ™ as a bis (3-triethoxysilylpropyl) polysulfide containing from an average of about 2 to about 2.6 connecting sulfur atoms in its polysulfidic bridge, and referred to in this Example as a disulfide, on carbon carrier in a 50/50 weight ratio from Degussa and reported in the Table on a basis of the disulfide material with the carbon black
[6]Combination of accelerators of the sulfenamide and diphenyl guanidine types The prepared rubber Samples were cured at a temperature of about 150° C. for about 32 minutes and various physical properties (rounded numbers are reported herein) reported in the following Table 2.

TABLE 2

| Properties | Control Sample A | Sample B |
|---|---|---|
| Rheometer, 150° C. | | |
| Maximum torque (dNm) | 17.48 | 20.3 |
| Minimum torque (dNm) | 4.88 | 5.82 |
| Delta torque (dNm) | 12.6 | 14.44 |
| T90 (minutes) | 12.6 | 10.5 |
| Stress/strain | | |
| Tensile strength (MPa) | 20.5 | 19.8 |
| Elongation at break (%) | 538 | 490 |
| 300% modulus (MPa) | 9.1 | 9.9 |
| Hardness, Shore A | | |
| 23° C. | 70 | 73 |
| 100° C. | 60 | 63 |
| Rebound | | |
| 23° C. | 41 | 44 |
| 100° C. | 55 | 57 |

From Table 2 it is seen that Sample B, which contains the amine functionalized styrene/butadiene copolymer elastomer A-SBR No. 1, provided an increase in the rebound properties as compared to the Control Sample A, which contained the more conventional S-SBR No.1, which is indicative of improved rolling resistance (reduced rolling resistance) for a tire having a tread of such composition and an associated greater vehicular fuel economy.

From Table 2 it is also seen that Sample B, provides higher hardness value properties, as compared to the Control Sample A, which is indicative of an improved handling property for a tire having a tread of such rubber composition.

EXAMPLE II

For this Example, rubber compositions as mixtures of functionalized carbon black (carbon black having silica domains on its surface which in turn is understood to contain hydroxyl groups on their surface) and S-SBR No. 2, or A-SBR No. 2, together with an alkoxysilane polysulfide coupling agent, were prepared as identified herein Control Sample C and Sample D, respectively.

Both Samples contained the coupling agent and additionally contained antidegradant(s) (para-phenylene diamine type), tackifying resin, fatty acid, zinc oxide, rubber processing (aromatic) oil, and peptizer as well as sulfur and vulcanization accelerators.

The ingredients were mixed in one non-productive mixing state in an internal rubber mixer for about three minutes to a temperature of about 160° C., the resulting batch of rubber composition dumped from the mixer and cooled to below 40° C., followed by mixing the batch in a productive mixing stage in an internal rubber mixer for about two minutes to a temperature of about 110° C.

The rubber blends are exemplified in the following Table 3.

TABLE 3

| Material | Control Sample C | Sample D |
|---|---|---|
| Non-Productive Mix Stage (to about 150° C.) | | |
| Synthetic cis 1,4-polyisoprene rubber[1] | 25 | 25 |
| S-SBR No. 2 rubber[2] | 75 | 0 |
| Functionalized carbon black[3] | 75 | 75 |
| Fatty acid[4] | 3 | 3 |
| Aromatic oil | 20 | 20 |
| Antidegradant | 2.25 | 2.25 |
| Coupling agent[5] | 8 | 8 |
| A-SBR No.2 rubber SBR | 0 | 75 |
| Productive Mix Stage (to about 110° C.) | | |
| Accelerator(s)[6] | 2.4 | 2.4 |
| Zinc oxide | 2.5 | 2.5 |
| Sulfur | 1.4 | 1.4 |

[1]Synthetic cis 1,4-polyisoprene elastomer obtained as NAT2200 ™ from The Goodyear Tire & Rubber Company
[2]Organic solvent solution prepared styrene/butadiene rubber containing about 25 percent bound styrene obtained as Solflex ® 2535 from The Goodyear Tire & Rubber Company
[3]Carbon black as CRX4210 ™, (ECO ™ black 4210) from the Cabot Corporation.
[4]Primarily stearic acid
[5]Coupling agent as X266S ™ as a bis (3-triethoxysilylpropyl) polysulfide containing from an average of about 2 to about 2.6 connecting sulfur atoms in its polysulfidic bridge, and referred to in this Example as a disulfide, on carbon carrier in a 50/50 weight ratio from Degussa and reported in the Table on a basis of the disulfide material with the carbon black.
[6]Combination of accelerators of the sulfenamide and diphenyl guanidine types The prepared rubber Samples were cured at a temperature of about 150° C. for about 32 minutes and various physical properties (rounded numbers are reported herein) reported in the following Table 4.

TABLE 4

| Material | Control Sample C | Sample D |
|---|---|---|
| Rheometer, 150° C. | | |
| Maximum torque (dNm) | 16.18 | 17.08 |
| Minimum torque (dNm) | 4.31 | 4.36 |
| Delta torque (dNm) | 11.87 | 12.72 |
| T90 (minutes) | 16.9 | 17.9 |
| Stress/strain | | |
| Tensile strength (MPa) | 18.5 | 18.9 |
| Elongation at break (%) | 430 | 427 |
| 300% modulus (MPa) | 12.2 | 12.5 |
| Hardness, Shore A | | |
| 23° C. | 73 | 71 |
| 100° C. | 59 | 58 |
| Rebound | | |
| 23° C. | 23 | 23 |
| 100° C. | 53 | 55 |

From Table 4 it is seen that Sample D, which contains the amine functionalized styrene/butadiene copolymer elastomer A-SBR No. 2, provided an increase in the hot, 100° C., rebound property as compared to the Control Sample C, which contained the more conventional styrene/butadiene copolymer elastomer S-SBR No. 2, which is indicative of improved rolling resistance (reduced rolling resistance) for a tire having a tread of such composition and an associated improved vehicular fuel economy.

EXAMPLE III

For this Example, rubber compositions as mixtures of functionalized carbon black (carbon black having silica domains on its surface which in turn are understood to contain hydroxyl groups on their surface) and S-SBR No. 3, or A-SBR No. 3, together with an alkoxysilane polysulfide coupling agent, were prepared as identified herein Control Sample E and Sample F, respectively.

Both Samples contained the coupling agent and additionally contained antidegradant(s) (para-phenylene diamine type), tackifying resin, fatty acid, zinc oxide, rubber processing (aromatic) oil, and peptizer as well as sulfur and vulcanization accelerators.

The ingredients were mixed in one non-productive mixing state in an internal rubber mixer for about three minutes to a temperature of about 160° C., the resulting batch of rubber composition dumped from the mixer and cooled to below 40° C., followed by mixing the batch in a productive mixing stage in an internal rubber mixer for about two minutes to a temperature of about 110° C.

The rubber blends are exemplified in the following Table 5.

TABLE 5

| Material | Control Sample E | Sample F |
|---|---|---|
| Non-Productive Mix Stage (to about 160° C.) | | |
| Synthetic cis 1,4-polyisoprene rubber[1] | 25 | 25 |
| S-SBR No.3 rubber[2] | 75 | 0 |
| Functionalized carbon black[3] | 75 | 75 |
| Fatty acid[4] | 3 | 3 |
| Aromatic oil | 20 | 20 |

TABLE 5-continued

| Material | Control Sample E | Sample F |
|---|---|---|
| Antidegradant | 2.25 | 2.25 |
| Coupling agent[5] | 8 | 8 |
| A-SBR No. 3 rubber | 0 | 75 |
| Productive Mix Stage (to about 110° C.) | | |
| Accelerator(s)[7] | 2.4 | 2.4 |
| Zinc oxide | 2.5 | 2.5 |
| Sulfur | 1.4 | 1.4 |

[1]Synthetic cis 1,4-polyisoprene elastomer obtained as NAT2200 ™ from The Goodyear Tire & Rubber Company
[2]Organic solvent solution prepared styrene/butadiene rubber containing about 33 percent bound styrene obtained as Solflex ® 3310 from The Goodyear Tire & Rubber Company
[3]Carbon black as CRX4210 ™, (ECO ™ black 4210), from the Cabot Corporation
[4]Primarily stearic acid
[5]Coupling agent as X266S ™ as a bis (3-triethoxysilylpropyl) polysulfide containing from an average of about 2 to about 2.6 connecting sulfur atoms in its polysulfidic bridge, and referred to in this Example as a disulfide, on carbon carrier in a 50/50 weight ratio from Degussa and reported in the Table on a basis of the disulfide material with the carbon black.
[6]Combination of accelerators of the sulfenamide and diphenyl guanidine types The prepared rubber Samples were cured at a temperature of about 150° C. for about 32 minutes and various physical properties (rounded numbers are reported herein) reported in the following Table 6.

TABLE 6

| Material | Control Sample E | Sample F |
|---|---|---|
| Rheometer, 150° C. | | |
| Maximum torque (dNm) | 15.96 | 17.46 |
| Minimum torque (dNm) | 4.43 | 4.73 |
| Delta torque (dNm) | 11.53 | 12.73 |
| T90 (minutes) | 10.9 | 12.6 |
| Stress/strain | | |
| Tensile strength (MPa) | 20.2 | 21.4 |
| Elongation at break (%) | 536 | 538 |
| 300% modulus (MPa) | 9.4 | 10.4 |
| Hardness, Shore A | | |
| 23° C. | 70 | 72 |
| 100° C. | 58 | 61 |
| Rebound | | |
| 23° C. | 37 | 37 |
| 100° C. | 52 | 54 |

From Table 6 it is seen that Sample F, which contains the amine functionalized styrene/butadiene copolymer A-SBR No.3, provided an increase in hot, 100° C., rebound property as compared to the Control Sample E, which contained the more conventional styrene/butadiene copolymer elastomer S-SBR No.3, which is indicative of improved rolling resistance (reduced rolling resistance) for a tire having a tread of such composition and a corresponding improved vehicular fuel economy.

From Table 6 it is also seen that Sample F, provided increased hardness properties, as compared to the Control Sample E, which is indicative of an improved handling property for a tire having a tread of such rubber composition.

While certain representative embodiments and details have been shown for the purpose of illustrating the invention, it will be apparent to those skilled in this art that various changes and modifications may be made therein without departing from the spirit or scope of the invention.

What is claimed is:

1. A tire having at least one component of a rubber composition comprised of, based upon parts by weight per 100 parts by weight of elastomer (phr),
(A) elastomers comprised of:
   (1) about 30 to about 80 phr of an amine functionalized styrene/conjugated diene copolymer elastomer which contains pendant and/or terminal amine groups selected from primary amine, secondary amine, tertiary amine and heterocyclic amine groups, wherein said conjugated diene of said copolymer is selected from at least one of isoprene and butadiene, and
   (2) about 20 to about 70 phr of at least one additional conjugated diene-based elastomer; and
(B) about 35 to about 100 phr of particulate reinforcement comprised of
   (1) about 10 to about 100 phr of silanol functionalized carbon black comprised of carbon black having domains of silica on its surface wherein said silica domains contain silanol groups on their surfaces, and
   (2) from zero to about 90 phr of at least one of synthetic amorphous silica and carbon black without domains of silica on its surface, and mixtures thereof, wherein said synthetic amorphous silica contains hydroxyl groups on its surface, and
(C) an alkoxysilane polysulfide based coupling agent having:
   (1) an alkoxysilane moiety reactive with
      (a) said silanol groups contained on the surface of said silica domains on the surface of said functionalized carbon black and said silanol groups on the surface of said synthetic amorphous silica; and
      (b) said amine groups of said amine functionalized styrene/conjugated diene copolymer elastomer; and
   (2) a polysulfide moiety interactive with polybutadiene portion of said amine functionalized styrene/conjugated diene copolymer elastomer and with said additional conjugated diene-based elastomer;
wherein:
(D) said carbon black which contains said domains of silica on its surface is pre-reacted with said coupling agent to form a composite thereof prior to addition to said amine functionalized styrene/conjugated diene copolymer elastomer,
(E) said coupling agent is a combination of a first alkoxysilane polysulfide as a bis-(3-triethoxysilylpropyl) polysulfide having an average of from 2 to 2.6 connecting sulfur atoms in its polysulfidic bridge and a second polysulfide as a bis-(3-triethoxysilylpropyl) polysulfide having an average of from 3 to 4 connecting sulfur atoms in its polysulfidic bridge, wherein said first polysulfide is blended with said rubber composition in the absence of sulfur and sulfur vulcanization accelerator and wherein said second polysulfide is thereafter blended with said rubber composition in the presence of sulfur and at least one sulfur vulcanization accelerator, and/or
(F) at least one amine group is introduced as one or more terminal amine groups at an end of the copolymer chain by copolymerizing styrene and at least one of 1,3-butadiene and isoprene monomers in an organic solvent solution in the presence of using a polymerization initiator of the general formula (IV):

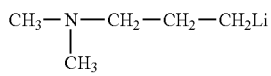

wherein said polymerization initiator is modified by chain extension with isoprene.

2. The tire of claim 1 wherein said styrene/conjugated copolymer elastomers are selected from at least one of styrene/butadiene and styrene/isoprene/butadiene terpolymer elastomers.

3. The tire of claim 1 wherein said elastomers are comprised of
(A) elastomers comprised of:
(1) about 30 to about 80 phr of said amine functionalized styrene/conjugated diene copolymer selected from at least one of styrene/butadiene copolymer and styrene/isoprene/butadiene terpolymer elastomers which contain(s) pendant and/or terminal amine groups selected from primary amine, secondary amine, tertiary amine and heterocyclic amine groups, and
(2) about 20 to about 70 phr of at least one additional conjugated diene-based elastomer.

4. The tire of claim 1 wherein said coupling agent is a bis(3-triethoxysilylpropyl) polysulfide which contains an average of from 2 to 4, an average of from about 2 to about 2.6 or an average of from about 3.5 to about 4 connecting sulfur atoms in its polysulfidic bridge.

5. The tire of claim 1 wherein, for said silanol functionalized carbon black, said silica domains cover from about 10 to about 70 percent of the surface of the carbon black.

6. The tire of claim 1 wherein said rubber composition is exclusive of said synthetic amorphous silica reinforcement.

7. The tire of claim 1 wherein said amine functional styrene/conjugated diene copolymer elastomer contains at least one terminal amine group.

8. The tire of claim 1 wherein said amine functional styrene/conjugated diene copolymer elastomer contains pendant amine groups.

9. The tire of claim 1 wherein said amine functionalized styrene/conjugated diene copolymer is an amine functionalized styrene/butadiene copolymer which contains from about 5 to about 40 weight percent bound styrene based upon the styrene/butadiene copolymer.

10. The tire of claim 1 wherein said amine functionalized styrene/conjugated diene copolymer is an amine functionalized styrene/isoprene/butadiene terpolymer which contains from about 10 to about 30 weight percent styrene, about 10 to about 70 weight percent isoprene and about 10 to about 70 weight percent butadiene based upon the styrene/isoprene/butadiene terpolymer.

11. The tire of claim 1 wherein at least one amine group is introduced as one or more terminal amine groups at an end of the copolymer chain by copolymerizing styrene and at least one of 1,3-butadiene and isoprene monomers in an organic solvent solution in the presence of using a polymerization initiator of the general formula (IV):

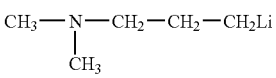

12. The tire of claim 11 wherein said polymerization initiator is modified by chain extension with isoprene.

13. The tire of claim 1 wherein said amine group of said amine functionalized styrene/conjugated diene copolymer elastomer is of the general formula (I):

wherein x is a value of from 1 or 3 and R is selected from saturated straight chain alkyl radicals and saturated branched alkyl radicals which contain from 1 through 18 carbons, provided that at least one saturated alkyl radical contains from 1 through 6 carbons;

wherein said amine group is of the general formula (II):

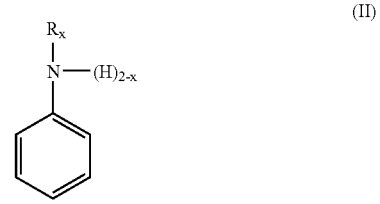

wherein x is a value of from 1 or 2, R is selected from said saturated straight chain and said saturated branched alkyl radicals having from 1 through 20 carbon atoms, provided however that at least one R contains from 1 through 6 carbon atoms;

wherein said amine group is one of the general formulas (III-A), (III-B) or (III-C):

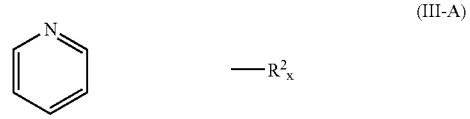

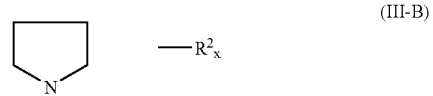

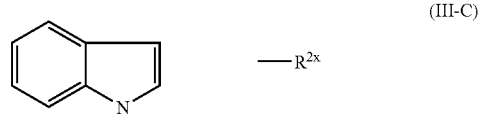

wherein, x is a value of from zero through 2, and wherein $R^2$ is a saturated alkyl radical containing from 1 through 6 carbon atoms.

14. The tire of claim 1 wherein said additional conjugated diene-based elastomer is selected from homopolymers and copolymers of isoprene and 1,3-butadiene and copolymers of isoprene and/or 1,3-butadiene with at least one of styrene and alphamethyl styrene.

15. The tire of claim 1 wherein said amine functionalized styrene/conjugated diene copolymer elastomer and/or said additional conjugated diene based elastomer is a tin-coupled elastomer.

16. The tire of claim 1 wherein said functionalized styrene/conjugated diene copolymer elastomer is prepared by (A) copolymerizing styrene and at least one of 1,3-butadiene and isoprene monomers in an organic solvent solution with a non-cyclic amine initiator 3-(N,N-dimethylamine)-1-propyl lithium of the general formula (IV):

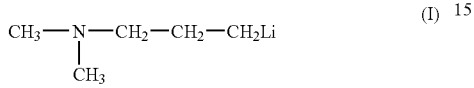
(I)

(B) copolymerizing styrene and at least one of 1,3-butadiene and isoprene monomers in an organic solvent solution with the amine initiator of said formula (IV), wherein said amine initiator has been modified by chain extension with isoprene;

(C) copolymerizing styrene and at least one of 1,3-butadiene and isoprene monomers in an organic solvent solution with a pyrrolidine cyclic amine based initiator as 3-pyrrolidino-1-propyl lithium;

(D) pre-reacting divinyl benzene with an amine to form a modified divinyl benzene which contains the amine substituent and introducing the modified divinyl benzene into a copolymerization of the styrene and at least one of 1,3-butadiene and isoprene monomers at a suitable stage of the copolymerization process in an organic solvent solution;

(E) modifying a styrene monomer with a pyrrolidone and copolymerizing the modified styrene with at least one of 1,3-butadiene and isoprene monomers in an organic solvent solution;

(F) introducing a vinyl pyrrolidone during the copolymerization of the styrene and at least one of 1,3-butadiene and isoprene monomers to effect pendent amine groups from the resultant styrene/butadiene copolymer elastomer.

17. The tire of claim 1 wherein said tire component is a tire tread.

* * * * *